United States Patent
Lyublinski et al.

(10) Patent No.: US 8,071,200 B2
(45) Date of Patent: Dec. 6, 2011

(54) RUST-RESISTANT TAPE

(75) Inventors: Efim Ya Lyublinski, Solon, OH (US); Keiji Uemura, Ashiya (JP); Yefim Vaks, South Euclid, OH (US)

(73) Assignee: Northern Technologies International Corporation, Beachwood, OH (US)

( * ) Notice: Subject to any disclaimer, the term of this patent is extended or adjusted under 35 U.S.C. 154(b) by 0 days.

(21) Appl. No.: 12/444,045

(22) PCT Filed: Oct. 3, 2007

(86) PCT No.: PCT/US2007/021361
§ 371 (c)(1),
(2), (4) Date: Feb. 16, 2010

(87) PCT Pub. No.: WO2008/042439
PCT Pub. Date: Apr. 10, 2008

(65) Prior Publication Data
US 2010/0143664 A1    Jun. 10, 2010

(30) Foreign Application Priority Data
Oct. 3, 2006   (TW) .............................. 95136748 A

(51) Int. Cl.
*B65D 85/90* (2006.01)
(52) U.S. Cl. ............ 428/195.1; 428/343; 428/354; 428/355; 428/356
(58) Field of Classification Search .......... 428/195.1
See application file for complete search history.

(56) References Cited

U.S. PATENT DOCUMENTS

| | | |
|---|---|---|
| 4,290,912 A | 9/1981 | Boerwinkel et al. |
| 4,472,231 A | 9/1984 | Jenkins |
| 4,944,916 A | 7/1990 | Franey |
| 5,051,259 A * | 9/1991 | Olsen et al. ............... 424/443 |
| 5,139,700 A | 8/1992 | Miksic et al. |
| 5,154,886 A | 10/1992 | Franey et al. |
| 5,320,778 A | 6/1994 | Miksic et al. |
| 5,422,184 A | 6/1995 | Papathomas |
| 5,736,231 A | 4/1998 | Todt |
| 5,756,007 A | 5/1998 | Franey |
| 5,855,975 A | 1/1999 | Miksic et al. |
| 5,959,021 A | 9/1999 | Franey |
| 6,132,827 A * | 10/2000 | Miro ...................... 428/35.9 |

(Continued)

FOREIGN PATENT DOCUMENTS

WO   WO/03/012159   * 2/2003

(Continued)

*Primary Examiner* — Mark Ruthkosky
*Assistant Examiner* — Ian Rummel
(74) *Attorney, Agent, or Firm* — Hudak, Shunk & Farine Co. LPA

(57) ABSTRACT

The present invention generally relates to rust-resistant tape formulations and/or structures. In one embodiment, the present invention relates to a rust-resistant tape that comprises a polymer base material layer, an adhesive layer and a rust-resistant component. In one embodiment, the adhesive layer adhered to one side of the layer of polymer base material. In another embodiment, the rust-resistant component comprises at least one volatile, or vapor-phase, corrosion inhibitor (VCI) that is placed into the matrix of the polymer base material or the adhesive layer. In still another embodiment, the at least one volatile, or vapor-phase, corrosion inhibitor (VCI) component of the present invention is contained within a discrete layer. In one instance, a rust-resistant tape in accordance with the present invention can be directly applied to a metal surface to be protected.

4 Claims, 7 Drawing Sheets

U.S. PATENT DOCUMENTS

| | | |
|---|---|---|
| 6,218,005 B1 | 4/2001 | Moh |
| 2002/0088533 A1 | 7/2002 | Mercure et al. |
| 2003/0151159 A1 | 8/2003 | Santisteban |
| 2004/0069972 A1* | 4/2004 | Kubik et al. ............... 252/389.3 |
| 2005/0019537 A1 | 1/2005 | Nakaishi et al. |

FOREIGN PATENT DOCUMENTS

| | | |
|---|---|---|
| WO | WO 03/012159 A2 | 2/2003 |

* cited by examiner

RUST-RESISTANT TAPE

RELATED APPLICATION DATA

This patent application claims priority to Taiwanese Patent Application No. 095136748, filed Oct. 3, 2006, entitled "Rust-Resistant Tape," the disclosure of which is hereby incorporated by reference in its entirety.

FIELD OF THE INVENTION

The present invention generally relates to rust-resistant tape formulations and/or structures. In one embodiment, the present invention relates to a rust-resistant tape that comprises a polymer base material layer, an adhesive layer and a rust-resistant component. In one embodiment, the adhesive layer adhered to one side of the layer of polymer base material. In another embodiment, the rust-resistant component comprises at least one volatile, or vapor-phase, corrosion inhibitor (VCI) that is placed into the matrix of the polymer base material or the adhesive layer. In still another embodiment, the at least one volatile, or vapor-phase, corrosion inhibitor (VCI) component of the present invention is contained within a discrete layer. In one instance, a rust-resistant tape in accordance with the present invention can be directly applied to a metal surface to be protected.

BACKGROUND OF THE INVENTION

Metal is one of the most widely used materials in the world. One can find metal in small objects from jewelry to large objects like buildings. Metal has various desirable properties and many applications; however, metal is susceptible to oxidation and corrosion (e.g., rust). Under normal conditions, if water and/or or one or more additional oxidizing components (oxygen, $CO_2$, $SO_2$, $H_2S$, $Cl^-$, etc) are present in the environment, such components react with various metals to produce rust or various other corrosion by-products. This is especially true in high-temperature and high-humidity environments where metal in these environments is more quickly corroded. Therefore, it is important to prevent metal components from succumbing to environmental corrosion.

Generally there are two ways to protect metal components from corrosion. They are permanent rust prevention and temporary rust prevention where permanent rust prevention uses metal coatings, such as zinc-plating and chrome-plating, and/or polymer coatings, such as paints. On the other hand, temporary rust prevention utilizes oil coatings and/or wax-based coating, or tries to improve various environmental conditions by using drying agents or protective liners such as aluminum foil. In temporary rust prevention, the coating can separate the surface of metal from air and water to prevent it from being corroded by rust. However, this solution loses efficacy due to the oxidation of the antirust oil/wax itself and/or it takes a lot of time and energy to remove this coating. Additionally such coatings tend to be harmful to environmental. Drying agents generally are cost prohibitive and the amount of such compounds needs to be calculated precisely. Also, in some applications, drying agents must be hermetically sealed and are therefore inconvenient for import-export customs inspection. Another drawback to drying agents is that they easily absorb moisture in the air and reach their saturation point in a short time thereby necessitating replacement.

Recently another corrosion protection technology has emerged, this being volatile, or vapor phase, corrosion inhibitors (VCIs). One application of these materials is to add one or more VCIs into traditional packing materials. VCIs function due to the fact that volatile, or vapor phase, corrosion inhibitor volatilizes into a gas, or vapor, and this gas, or vapor, is transferred to the surface of the item/article/surface to be protected by condensation of the VCI's vapor on the surface of the item, article, and/or surface to be protected.

In the marketplace, there are products that contain one or more volatile corrosion inhibitors in a paper, or plastic, sheet. Such products are then used to wrap metal objects to protect such objects from corrosion. However, such products suffer from various drawbacks. For example, paper wrappings cannot be adhered hermitically onto the surface of a metal object thereby resulting in a gap between the paper and metal object. As such, paper-based VCI wrappings cannot completely prevent the oxygen and moisture in the air from reaching the surface of a metal object. Furthermore, such paper wrapping generally needs to be attached, or adhered, to a metal object with tape. This takes a significant amount of time and effort to accomplish and only offers a modest amount of additional protection in situations where the paper wrapper becomes wet or rips.

Thus there is a need in the art for a solution to various corrosion issues where VCI-containing paper and polymer films, or wrappings, do not alone offer adequate protection.

SUMMARY OF THE INVENTION

The present invention generally relates to rust-resistant tape formulations and/or structures. In one embodiment, the present invention relates to a rust-resistant tape that comprises a polymer base material layer, an adhesive layer and a rust-resistant component. In one embodiment, the adhesive layer adhered to one side of the layer of polymer base material. In another embodiment, the rust-resistant component comprises at least one volatile, or vapor-phase, corrosion inhibitor (VCI) that is placed into the matrix of the polymer base material or the adhesive layer. In still another embodiment, the at least one volatile, or vapor-phase, corrosion inhibitor (VCI) component of the present invention is contained within a discrete layer. In one instance, a rust-resistant tape in accordance with the present invention can be directly applied to a metal surface to be protected.

In one embodiment, the present invention relates to a rust-resistant tape comprising: a polymer base layer having an upper surface and a lower surface; an adhesive layer having an upper surface and a lower surface, where the upper surface of the adhesive layer is in contact with the lower surface of the polymer base layer; and a rust-resistant component, wherein the rust-resistant component is formed from at least one volatile, or vapor phase, corrosion inhibitor and is located within the polymer base layer.

In another embodiment, the present invention relates to a rust-resistant tape comprising: a polymer base layer having an upper surface and a lower surface; an adhesive layer having an upper surface and a lower surface, where the upper surface of the adhesive layer is in contact with the lower surface of the polymer base layer; and a rust-resistant component, wherein the rust-resistant component is formed from at least one volatile, or vapor phase, corrosion inhibitor and is located within the adhesive layer.

In still another embodiment, the present invention relates to a rust-resistant tape comprising: a polymer base layer having an upper surface and a lower surface; a rust-resistant layer having an upper surface and a lower surface, where the upper surface of the rust-resistant layer is in contact with the lower surface of the polymer base layer, and an adhesive layer having an upper surface and a lower surface, where the upper surface of the adhesive layer is in contact with the lower surface of the rust-resistant layer, wherein the rust-resistant component is formed from at least one volatile, or vapor phase, corrosion inhibitor.

In still yet another embodiment, the present invention relates to a rust-resistant tape comprising: a polymer base layer having an upper surface and a lower surface; an adhesive layer having an upper surface and a lower surface, where the lower surface of the adhesive layer is in contact with the upper surface of the polymer base layer; and a rust-resistant layer having an upper surface and a lower surface, where the lower surface of the rust-resistant layer is in contact with the upper surface of the adhesive layer, wherein the rust-resistant layer contains at least one volatile, or vapor phase, corrosion inhibitor.

In still yet another embodiment, the present invention relates to a rust-resistant tape comprising: a polymer base layer having an upper surface and a lower surface; a non-continuous adhesive layer having an upper surface and a lower surface, where the lower surface of the adhesive layer is in contact with the upper surface of the polymer base layer; and a rust-resistant layer having an upper surface and a lower surface, where the lower surface of the rust-resistant layer is in contact with the upper surface of the polymer base layer, wherein the rust-resistant layer contains at least one volatile, or vapor phase, corrosion inhibitor and wherein the combination of the non-continuous adhesive layer and the rust-resistant layer form a single layer across the width of the polymer base layer.

In still yet another embodiment, the present invention relates to a rust-resistant tape comprising: a polymer base layer having an upper surface and a lower surface; a non-continuous adhesive layer having an upper surface and a lower surface, where the lower surface of the adhesive layer is in contact with the upper surface of the polymer base layer; and a rust-resistant layer having an upper surface and a lower surface, where the lower surface of the rust-resistant layer is in contact with the upper surface of the polymer base layer, wherein the rust-resistant layer contains at least one volatile, or vapor phase, corrosion inhibitor and wherein the combination of the non-continuous adhesive layer and the rust-resistant layer form a single layer across the width of the polymer base layer.

In still yet another embodiment, the present invention relates to a rust-resistant tape comprising: a polymer base layer having an upper surface and a lower surface; a first adhesive layer having an upper surface and a lower surface, where the lower surface of the first adhesive layer is in contact with the upper surface of the polymer base layer; a rust-resistant masterbatch layer having an upper surface and a lower surface, where the lower surface of the rust-resistant layer is in contact with a portion of the upper surface of the first adhesive layer; a non-continuous spacer layer having at least two discrete portions, where each portion having an upper surface and a lower surface and where the lower surface of each portion of the non-continuous spacer layer is in contact with the upper surface of the first adhesive layer; and a second adhesive layer having an upper surface and a lower surface, where the second adhesive layer is non-continuous and has at least two discrete portions, the discrete portions of the second adhesive layer being formed on the upper surface of the spacer layer, wherein the rust-resistant masterbatch layer contains at least one volatile, or vapor phase, corrosion inhibitor.

In still yet another embodiment, the present invention relates to a rust-resistant tape comprising: a polymer base layer having an upper surface and a lower surface; a first non-continuous adhesive layer having at least two discrete portions, each portion having an upper surface and a lower surface and where the lower surface of each portion of the first non-continuous adhesive layer is in contact with the upper surface of the polymer base; a rust-resistant layer having an upper surface and a lower surface, where the rust-resistant layer is placed between the two discrete portions of the first non-continuous adhesive layer and where the lower surface of the rust-resistant layer is in contact with a portion of the upper surface of the polymer base layer; a non-continuous spacer layer having at least two discrete portions, each portion having an upper surface and a lower surface and where the lower surface of each portion of the non-continuous spacer layer is in contact with the upper surface of the first non-continuous adhesive layer; and a second non-continuous adhesive layer having at least two discrete portions, each portion having an upper surface and a lower surface and where the lower surface of each portion of the non-continuous second adhesive layer is in contact with the upper surface of the non-continuous spacer layer, wherein the rust-resistant masterbatch layer contains at least one volatile, or vapor phase, corrosion inhibitor.

DETAILED DESCRIPTION OF THE INVENTION

The present invention generally relates to rust-resistant tape formulations and/or structures. In one embodiment, the present invention relates to a rust-resistant tape that comprises a polymer base material layer, an adhesive layer and a rust-resistant component. In one embodiment, the adhesive layer adhered to one side of the layer of polymer base material. In another embodiment, the rust-resistant component comprises at least one volatile, or vapor-phase, corrosion inhibitor (VCI) that is placed into the matrix of the polymer base material or the adhesive layer. In still another embodiment, the at least one volatile, or vapor-phase, corrosion inhibitor (VCI) component of the present invention is contained within a discrete layer. In one instance, a rust-resistant tape in accordance with the present invention can be directly applied to a metal surface to be protected.

In one embodiment, the present invention provides a rust-resistant tape which can be directly and hermetically adhered to the surface of a metal object to provide a better barrier against oxidation and corrosion. To achieve the above results, in one embodiment, the present invention is rust-resistant tape structure that comprises a main tape body and a rust-resistant component. The rust-resistant component of the present invention can be placed in, on, or around any portion, or portions of the tape structures described herein. In one embodiment, the present invention is a rust-resistant tape that comprises a polymer base layer and an adhesive layer that is located on at least one surface of the polymer base layer to yield a two layer, or sandwich-styled, structure. In this embodiment, the VCI portion of the present invention can be located in, on, or around either the polymer base layer or the adhesive layer. In another embodiment, the VCI component of the present invention is itself a discrete layer in the tape structure and is "carried" in a suitable tie layer located between the one surface of the polymer base layer and the corresponding surface of the adhesive layer.

Figure 1:
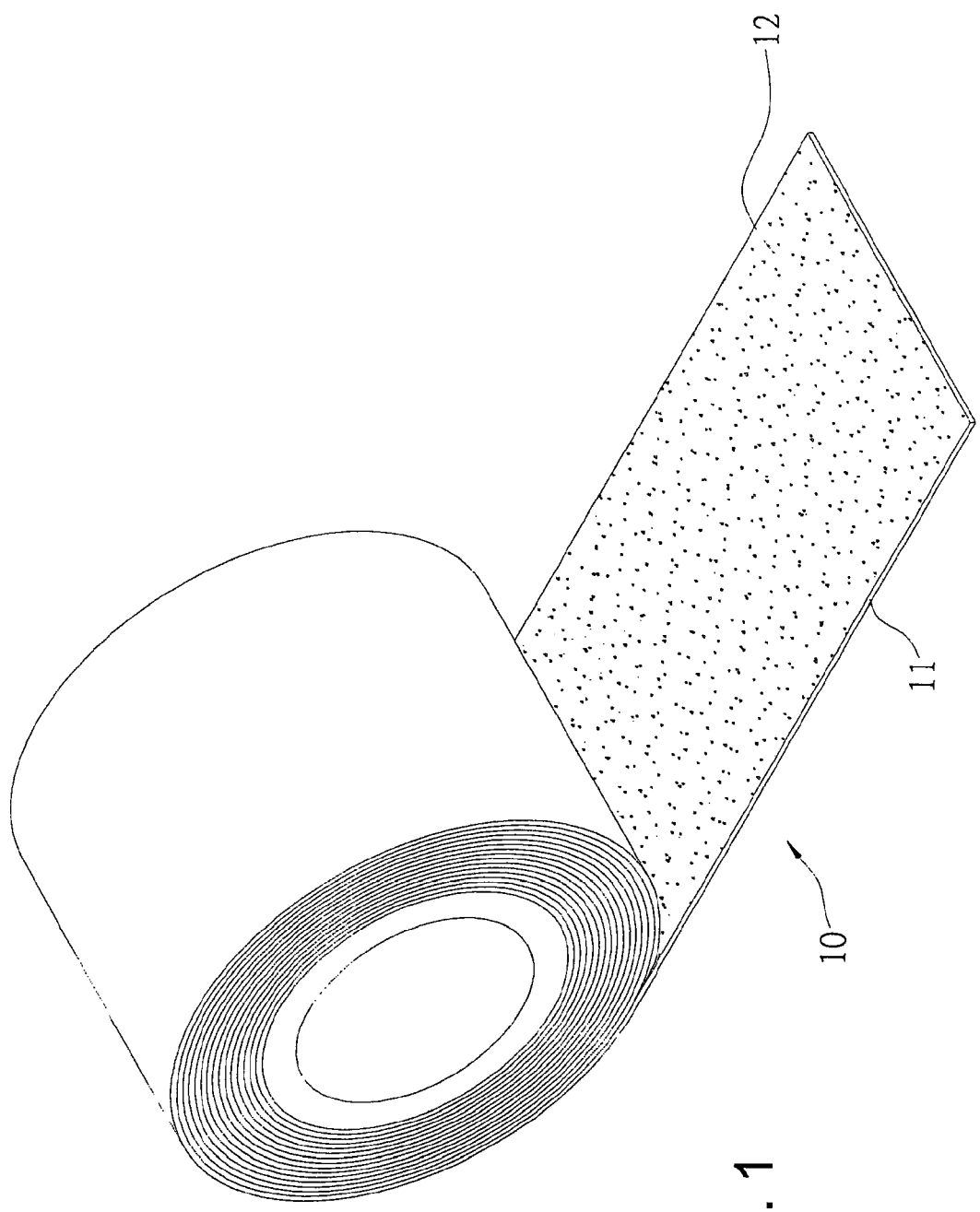
FIG. 1 is a perspective illustration of a roll of tape in accordance with one embodiment of the present invention.

Turning to the Figures, FIG. 1 is a perspective illustration of a roll of rust-resistant tape in accordance with one embodiment of the present invention. As is shown in FIG. 1, a rust-resistant tape 10 comprises polymer base layer 11 and a VCI containing adhesive layer 12. The adhesive layer is suitable to attach to tape of the present invention to one or more types of metal surfaces.

In one embodiment, polymer base material 11 can be made of polyethylene (PE), polypropylene (PP), polyethylene terephthalate (PET), PET-aluminum film (VMPET), nylon, p-phenylphenol (OPP), or cast polypropylene (CPP). Adhesive layer 12 is any suitable adhesive and can be cast, coated or co-extruded with the polymer base layer to form tape 10. Suitable compounds for adhesive layer 12 include, but are not limited to, rubbers, acrylics, elastomers, polyesters, silicones, polyurethanes, ethylene vinyl acetate, acrylic/epoxy mixtures, silica gels, glues, or suitable mixtures thereof. In another embodiment, the adhesive portion of the present invention can include hot melts, radiation curable adhesives, or the like. In still another embodiment, pressure sensitive adhesives that are permanent, removable, and repositionable are also contemplated as an adhesive layer in the present invention. Those skilled in the art will appreciate that the adhesive layer of the present invention can include, in some embodiments, blocking heat seals, non-blocking heat seals, thermoplastics, crosslinking, or composite adhesives.

Figure 2:
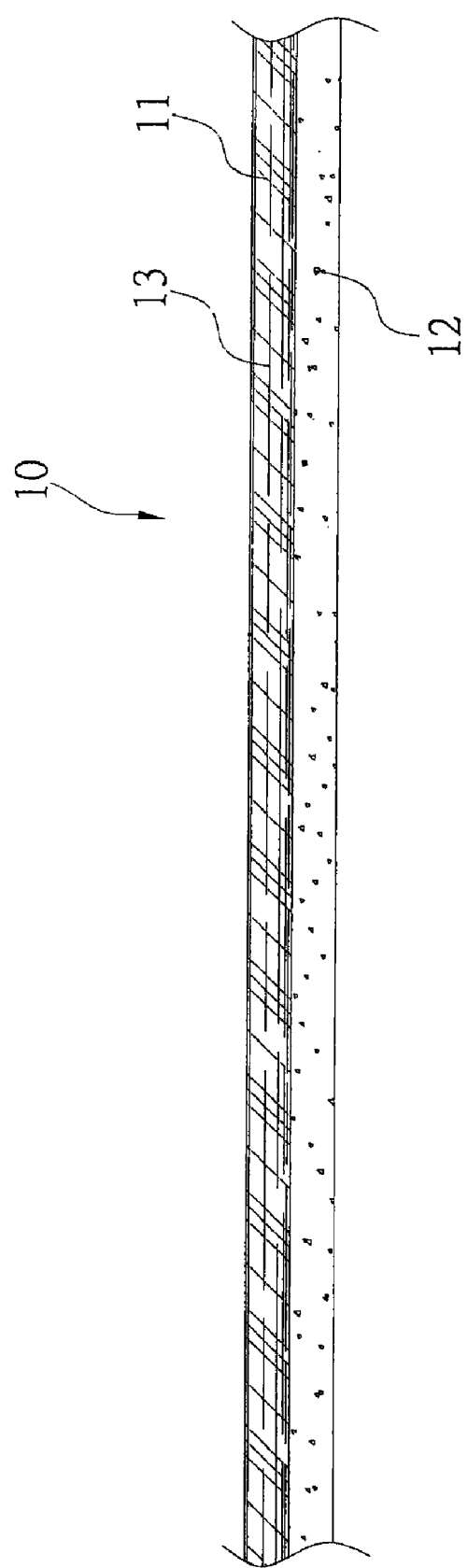
FIG. 2 is a cross-sectional illustration of a VCI tape in accordance with another embodiment of the present invention.

Turning to FIG. 2, FIG. 2 is a cross-sectional illustration of a rust-resistant tape in accordance with another embodiment of the present invention. In this embodiment, tape 10 comprises a polymer base layer 11, an adhesive layer 12 adhered to the lower surface of polymer base layer 11 and a rust-resistant component 13 formed from one or more volatile corrosion inhibitors (VCIs). As can be seen from FIG. 2, rust-resistant component 13 is located in the polymer matrix of polymer base layer 11. The one or more volatile corrosion inhibitors (VCIs) contained in located within polymer base layer 11 can volatilize through adhesion layer 12 to provide anti-corrosion protection in an area surrounding tape 10. In one embodiment, polymer base layer 11 is formed from polyethylene or polypropylene.

In connection with the present invention, suitable VCI compounds for use in connection with the present invention are known in the art and, as such, any suitable volatile or vapor phase corrosion inhibitors can be used in the rust-resistant tapes of the present invention. Suitable VCIs for use in the present invention are disclosed in U.S. Pat. Nos. 4,290,912; 5,320,778; and 5,855,975, which are incorporated herein by reference in their entirety for their teachings of such compounds. Examples of VCIs set forth in U.S. Pat. No. 4,290,912 include inorganic nitrite salts including metal nitrites, preferably Group I and II metal nitrites such as potassium nitrite, sodium nitrite, and calcium nitrite. Examples of VCIs set forth in U.S. Pat. No. 5,320,778 include anhydrous sodium molybdate [$Na_2MoO_4$], anhydrous ammonium dimolybdate [$(NH_4)_2 MoO_4$], or an anhydrous amine-molybdate. The preferred amine molybdates of this component of the composites of the present invention are amine-molybdates derived from the group consisting of dicyclohexylamine, 2-ethylhexylamine, and cyclohexylamine. Another group of VCIs comprise amine benzoates, amine nitrates and benzotriazole. A preferred composition comprises cyclohexylamine benzoate, ethylamine benzoate, dicyclohexylamine nitrate and benzotriazole Examples of VCIs set forth in U.S. Pat. No. 5,855,975 include sodium nitrite and benzotriazole. In a particularly preferred embodiment, a mixture in powder form is provided which comprises, by weight, about 70% anhydrous sodium molybdate, about 25% sodium nitrite, and about 5% benzotriazole. For example, useful vapor phase or volatile corrosion inhibitors include, but are not limited to, benzotriazole, and mixtures of benzoates of amine salts with benzotriazole, nitrates of amine salts, and $C_{13}H_{26}O_2N$.

Figure 3:
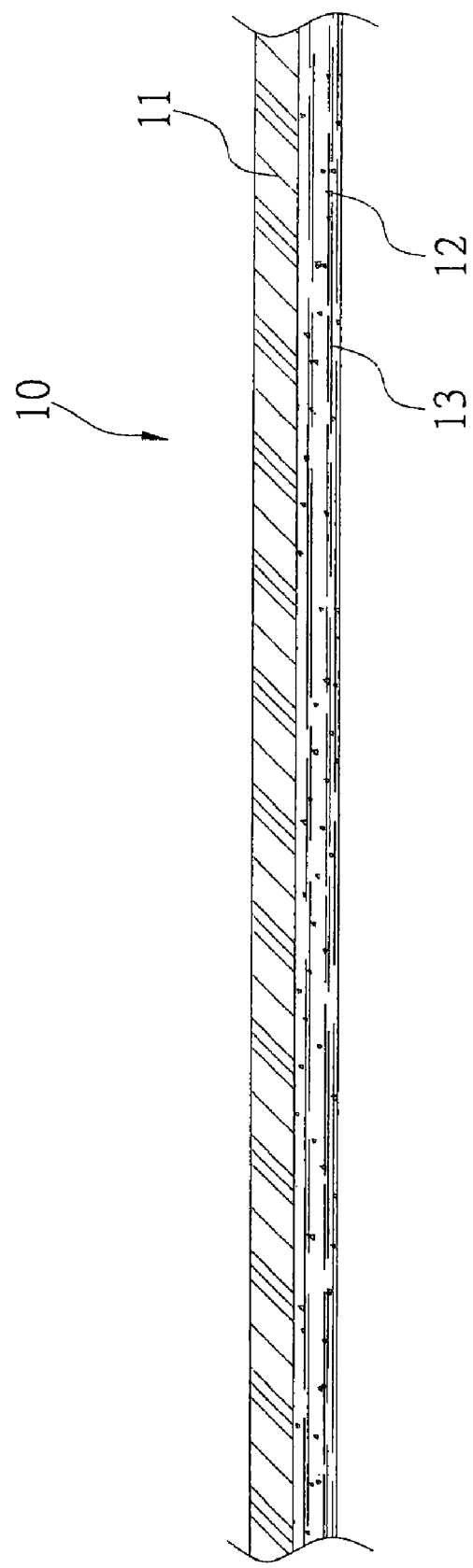
FIG. 3 is a cross-sectional illustration of a VCI tape in accordance with still another embodiment of the present invention.
Figure 4:
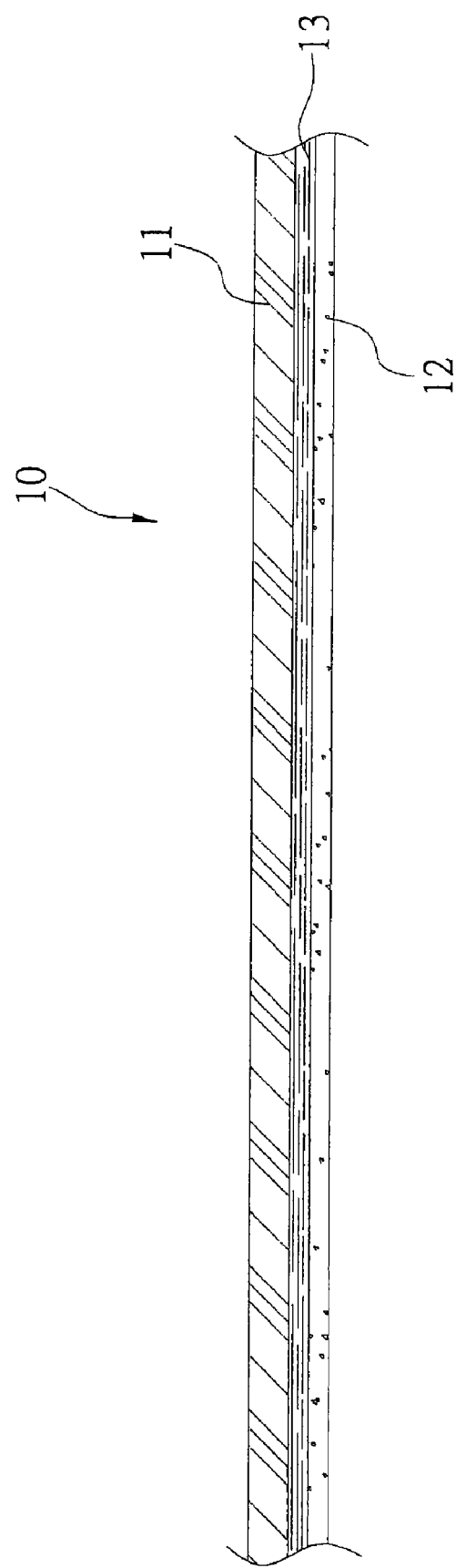
FIG. 4 is a cross-sectional illustration of a VCI tape in accordance with still yet another embodiment of the present invention.

Turning to FIG. 3, FIG. 3 is a cross-sectional illustration of a rust-resistant tape in accordance with still another embodiment of the present invention. In this embodiment, tape 10 comprises a polymer base layer 11, an adhesive layer 12 adhered to the lower surface of polymer base layer 11 and a rust-resistant component 13 formed from one or more volatile corrosion inhibitors (VCIs). As can be seen from FIG. 3, rust-resistant component 13 is located in adhesive layer 12. In another embodiment, rust-resistant component 13 is located in its own layer, where such layer is positioned between the lower surface of polymer base layer 11 and the upper surface of adhesive layer 12 (see FIG. 4). In the case of the embodiment of FIG. 4, rust-resistant component 13 is contained with a suitable "carrier" compound that acts as a carrier for the one or more VCI compounds. Suitable carriers for rust-resistant component 13 are polymer compositions that can act as a tie layer between base layer 11 and adhesive layer 12.

Figure 5:
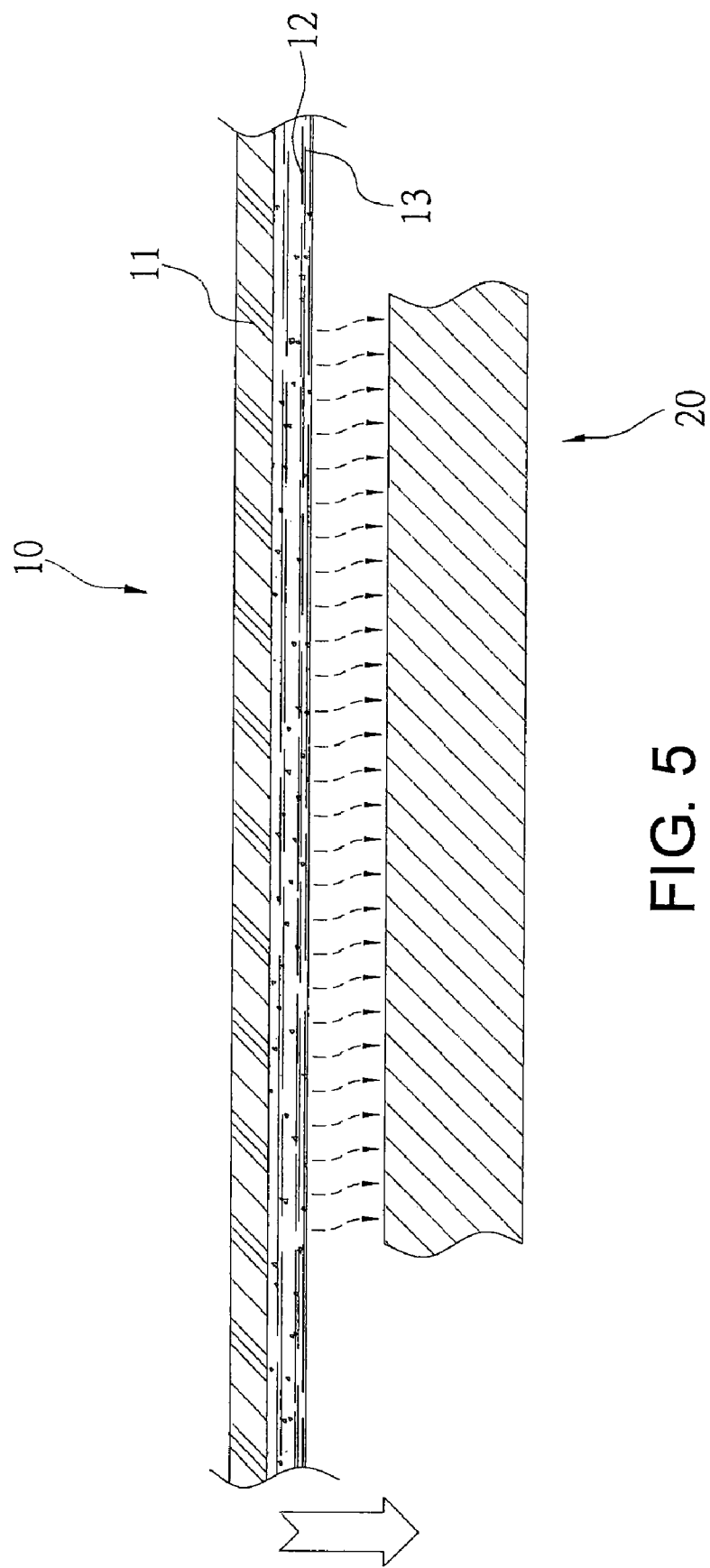
FIG. 5 is a cross-sectional illustration of a VCI tape in accordance with the present invention as it is applied to a metal surface.

Turning to FIG. 5, FIG. 5 is a cross-sectional illustration of the tape 10 of FIG. 3 as it is applied to a metal surface 20. As shown in FIG. 5, tape 10 can be adhered hermetically onto the surface of metal object 20 by the adhesion force of the adhesive layer 12 while the VCI contained in rust-resistant component 13 undergoes gradual glassification and volatilizes over time. This in turn protects the surface of metal object 20 to which tape 10 is applied from corrosive environmental elements (e.g., water vapor, etc.). Additionally, the VCI contained in tape 10 undergoes volatilization until an equilibrium is reached in any gas pockets trapped between the surface of metal object 20 and adhesive layer 12.

Moreover, in the case of a metal object 20 that is protected by a rust-resistant coating such as paint or an electroplated coating, water vapor in the air can still corrode the object's surface through such a coating. This can result in any such coating being sloughed off the surface of the metal object in question. In instance, the rust-resistant tape of the present invention can be adhered, or placed, onto the surface of such metal objects in order to provide additional protection to such surfaces.

Figure 6:
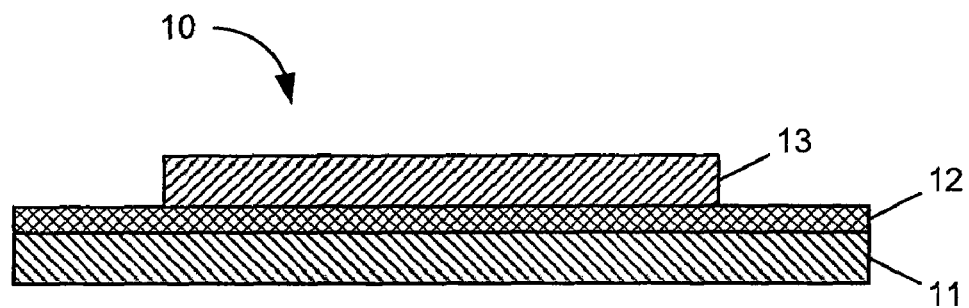
FIG. 6 is a cross-sectional illustration of a VCI tape in accordance with still yet another embodiment of the present invention.

Turning to FIG. 6, FIG. 6 is a cross-sectional illustration of a rust-resistant tape in accordance with still yet another embodiment of the present invention. In this embodiment, tape 10 comprises a polymer base layer 11, an adhesive layer 12 adhered to the upper surface of polymer base layer 11 and a discrete rust-resistant layer 13 adhered to the upper surface of adhesive layer 12, where rust-resistant layer 13 contains one or more volatile corrosion inhibitors (VCIs). In the embodiment of FIG. 6, rust-resistant layer 13 is formed from a combination of a polymer carrier and at least one volatile corrosion inhibitor (VCI).

Figure 7:
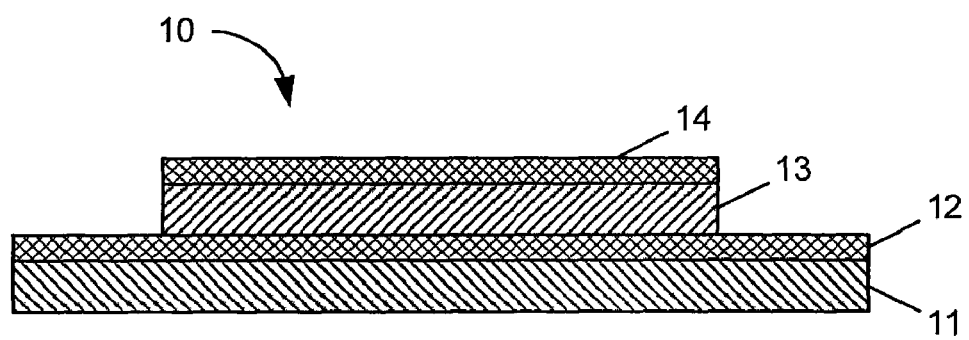
FIG. 7 is a cross-sectional illustration of a VCI tape in accordance with still yet another embodiment of the present invention.

Turning to FIG. 7, FIG. 7 is a variant of the embodiment of FIG. 6 where an additional adhesive layer 14 is formed on the upper surface of discrete rust-resistant layer 13. Given this, a more detailed discussion of this embodiment is omitted for the sake of brevity.

Figure 8:
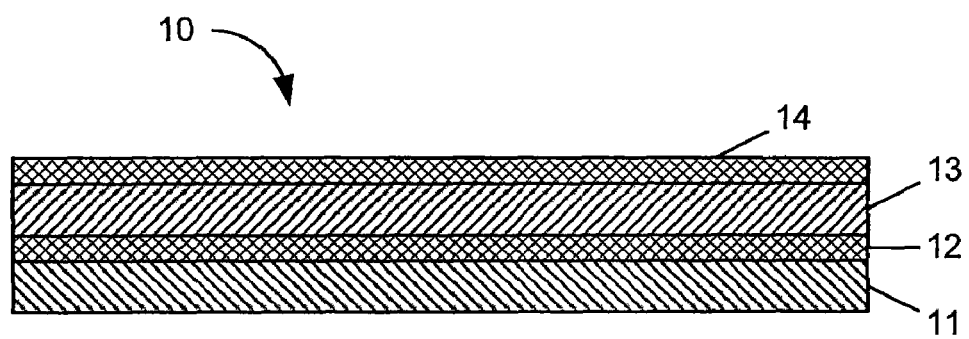
FIG. 8 is a cross-sectional illustration of a VCI tape in accordance with still yet another embodiment of the present invention.

In both of the embodiments illustrated in FIGS. 6 and 7, layer 13 and, if present, layer 14, are formed to be less than the full length of the width of underlying layers 11 and 12. On the other hand, tape 10 of FIG. 8 is an alternative embodiment of the tape of FIG. 7 where all four layers are formed across the whole width of the tape.

Figure 9:
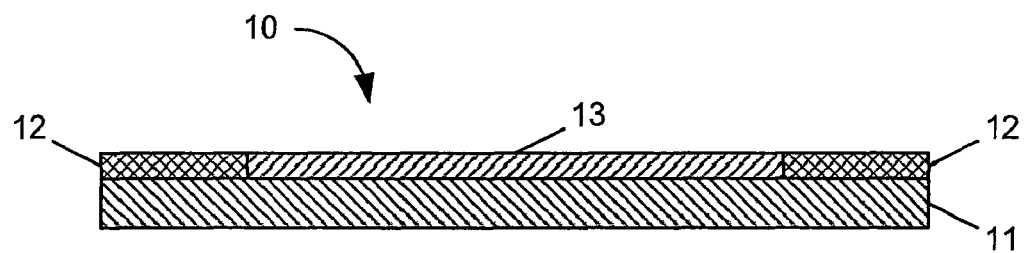
FIG. 9 is a cross-sectional illustration of a VCI tape in accordance with still yet another embodiment of the present invention.

Turning to FIG. 9, FIG. 9 is a cross-sectional illustration of a rust-resistant tape in accordance with still yet another embodiment of the present invention. In the embodiment of FIG. 9, adhesive layer 12 is formed in at least two discrete strips on either side of rust-resistant layer 13. In this embodiment, as can be seen from FIG. 9, rust-resistant layer 13 is in contact with the upper surface of polymer base layer 11.

Figure 10:
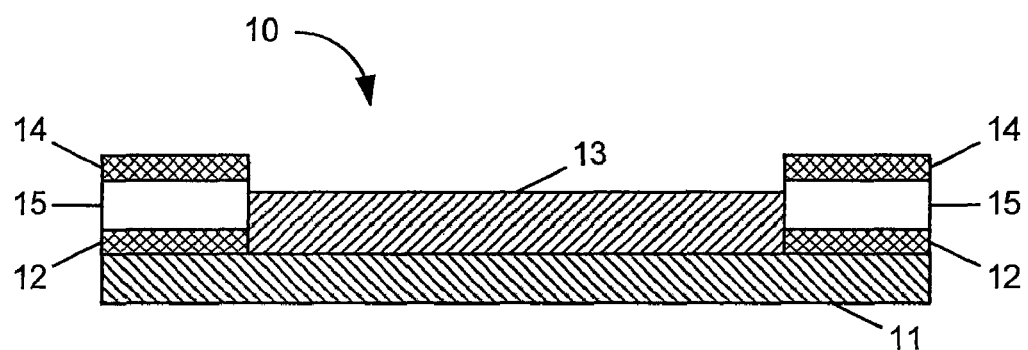
FIG. 10 is a cross-sectional illustration of a VCI tape in accordance with still yet another embodiment of the present invention.

Turning to FIG. 10, FIG. 10 is a cross-sectional illustration of a rust-resistant tape in accordance with still yet another embodiment of the present invention. In the embodiment of FIG. 10, adhesive layer 12 and adhesive layer 14 are formed in at least two discrete strips on either side of rust-resistant layer 13. The discrete portion of adhesive layers 12 and 14 are each separated by a spacer layer 15. In this embodiment, as can be seen from FIG. 10, not only is rust-resistant layer 13 is in contact with the upper surface of polymer base layer 11, the combination of layers 12, 13 and 14 is slightly thicker than rust-resistant layer 13 alone. This creates an air pocket when tape 10 of FIG. 10 is placed onto a metal surface. This, in turn, promotes protection of the metal surface contained within air pocket due to the increased concentration of one or more corrosion inhibiting compounds such as a VCI compound.

Figure 11:
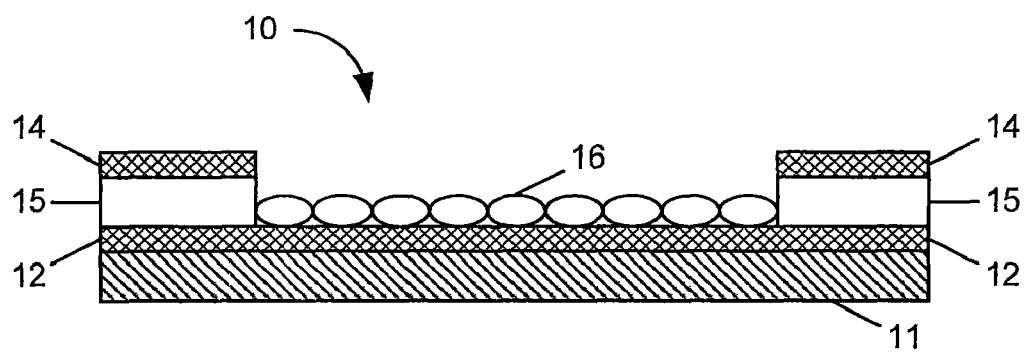
FIG. 11 is a cross-sectional illustration of a VCI tape in accordance with still yet another embodiment of the present invention.

Turning to FIG. 11, FIG. 11 is a cross-sectional illustration of a rust-resistant tape in accordance with still yet another embodiment of the present invention. In the embodiment of FIG. 11, adhesive layer 12 is formed across the complete width of polymer base layer 11 while adhesive layer 14 and spacer layers 15 are again formed in at least two discrete strips on either side of a rust-resistant masterbatch layer 16. In this embodiment, as can be seen from FIG. 11, rust-resistant masterbatch layer 16 is formed on a portion of the upper surface of adhesive layer 12. In this embodiment, the combination of layers 14 and 15 is slightly thicker than rust-resistant masterbatch layer 16 alone, thereby creating an air pocket similar to the embodiment of FIG. 10. Regarding rust-resistant masterbatch layer 16, layer 16 can be activated at any suitable time by the application of, for example, heat to the central portion of tape 16. This is advantageous in that tape 10 can be placed into "service" when appropriate. This in turn increases the service life of tape 10.

Regarding spacer layers 15, these layers are formed from any suitable polymer composition. In one embodiment, suitable polymer compositions for layer 15 include, but are not limited to, polyethylene, polypropylene, polyethylene terephthalates, PET-aluminum film, nylon, p-phenylphenol, or cast polypropylene.

In the case of the polymer carrier composition used to form rust-resistant layer 13 in any of the embodiments of FIGS. 6 through 10, any suitable polymer composition can be utilized to "carry" the one or more volatile, or vapor phase, corrosion inhibitors. Suitable polymer include, but are not limited to, polyethylene, polypropylene, polyethylene terephthalates, PET-aluminum film, nylon, p-phenylphenol, or cast polypropylene. Suitable compounds for adhesive layer 12 of FIGS. 6 through 11 include, but are not limited to, rubbers, acrylics, elastomers, polyesters, silicones, polyurethanes, ethylene vinyl acetate, acrylic/epoxy mixtures, silica gels, glues, or suitable mixtures thereof. In another embodiment, the adhesive portion of the present invention can include hot melts, radiation curable adhesives, or the like. In still another embodiment, pressure sensitive adhesives that are permanent, removable, and repositionable are also contemplated as an adhesive layer in the present invention. Those skilled in the art will appreciate that the adhesive layer of the present invention can include, in some embodiments, blocking heat seals, non-blocking heat seals, thermoplastics, crosslinking, or composite adhesives.

In still another embodiment, any of the tapes 10 can further include one or more non-volatile corrosion inhibitors therein. In one instance, such compounds are soluble in the polymer composition or adhesive composition used to form the various layers of the tapes disclosed herein. In another embodiment, such non-volatile corrosion inhibitors are nano-sized powders and are dispersed within one or more layers that make up the tapes of the present invention. In one embodiment, suitable non-volatile corrosion inhibitors or use in the present invention include, but are not limited to, those compounds described and disclosed in U.S. Pat. Nos. 5,959,021; 5,756,007; 5,154,886; and 4,944,916, the disclosures of which are hereby incorporated by reference in their entireties. For example, suitable non-volatile corrosion inhibitors can include Carboset® CR-780, carbon black (e.g., Black Pearls 2000 obtained from Cabot Corp.), and Ketjen Black (KBEC). In still another embodiment, additional non-volatile corrosion inhibitors besides those stated above are contemplated for use in the tapes of the present invention. Such non-volatile, or soluble, corrosion inhibitors are known in the art, and as such a discussion herein is omitted for the sake of brevity.

Although the invention has been shown and described with respect to certain embodiments, it is obvious that equivalent alterations and modifications will occur to others skilled in the art upon the reading and understanding of this specification. In particular with regard to the various functions performed by the above described components, the terms (including any reference to a "means") used to describe such components are intended to correspond, unless otherwise indicated, to any component which performs the specified function of the described component (e.g., that is functionally equivalent), even though not structurally equivalent to the disclosed structure which performs the function in the herein illustrated exemplary embodiments of the invention. In addition, while a particular feature of the invention may have been disclosed with respect to only one of several embodiments, such feature may be combined with one or more other features of the other embodiments as may be desired and advantageous for any given or particular application.

What is claimed is:

1. A rust-resistant tape comprising:
a polymer base layer having an upper surface and a lower surface;
a first adhesive layer having an upper surface and a lower surface, where the lower surface of the first adhesive layer is in contact with the upper surface of the polymer base layer;
a rust-resistant masterbatch layer having an upper surface and a lower surface, where the lower surface of the rust-resistant layer is in contact with a portion of the upper surface of the first adhesive layer;
a non-continuous spacer layer having at least two discrete portions, where each portion having an upper surface and a lower surface and where the lower surface of each portion of the non-continuous spacer layer is in contact with the upper surface of the first adhesive layer; and
a second adhesive layer having an upper surface and a lower surface, where the second adhesive layer is non-continuous and has at least two discrete portions, the discrete portions of the second adhesive layer being formed on the upper surface of the spacer layer,
wherein the rust-resistant masterbatch layer contains at least one volatile, or vapor phase, corrosion inhibitor.

2. The rust-resistant tape of claim 1, wherein said polymer base layer is formed from polyethylene, polypropylene, polyethylene terephthalate, PET-aluminum film, nylon, p-phenylphenol, or cast polypropylene; wherein said first adhesive layer is formed from rubbers, acrylics, elastomers, polyesters, silicones, polyurethanes, acrylic/epoxy mixtures, silica gels, glues, or mixtures thereof; wherein said rust-resistant layer is formed from polyethylene, polypropylene, polyethylene terephthalate, PET-aluminum film, nylon, p-phenylphenol, or cast polypropylene; and wherein said volatile corrosion inhibitor comprises a Group I or Group II metal nitrite, a sodium molybdate, an ammonium dimolybdate, or an amine molybdate, a benzotriazole, an amine benzoate, or an amine nitrate.

3. A rust-resistant tape comprising:
a polymer base layer having an upper surface and a lower surface;
a first non-continuous adhesive layer having at least two discrete portions, each portion having an upper surface and a lower surface and where the lower surface of each portion of the first non-continuous adhesive layer is in contact with the upper surface of the polymer base;
a rust-resistant layer having an upper surface and a lower surface, where the rust-resistant layer is placed between the two discrete portions of the first non-continuous adhesive layer and where the lower surface of the rust-resistant layer is in contact with a portion of the upper surface of the polymer base layer;
a non-continuous spacer layer having at least two discrete portions, each portion having an upper surface and a lower surface and where the lower surface of each portion of the non-continuous spacer layer is in contact with the upper surface of the first non-continuous adhesive layer; and
a second non-continuous adhesive layer having at least two discrete portions, each portion having an upper surface and a lower surface and where the lower surface of each portion of the non-continuous second adhesive layer is in contact with the upper surface of the non-continuous spacer layer,
wherein the rust-resistant masterbatch layer contains at least one volatile, or vapor phase, corrosion inhibitor.

4. The rust-resistant tape of claim 3, wherein said polymer base layer is formed from polyethylene, polypropylene, polyethylene terephthalate, PET-aluminum film, nylon, p-phenylphenol, or cast polypropylene; wherein said first adhesive layer is formed from rubbers, acrylics, elastomers, polyesters, silicones, polyurethanes, acrylic/epoxy mixtures, silica gels, glues, or mixtures thereof; wherein said rust-resistant layer is formed from polyethylene, polypropylene, polyethylene terephthalate, PET-aluminum film, nylon, p-phenylphenol, or cast polypropylene; and wherein said volatile corrosion inhibitor comprises a Group I or Group II metal nitrite, a sodium molybdate, an ammonium dimolybdate, or an amine molybdate, a benzotriazole, an amine benzoate, or an amine nitrate.

* * * * *